Figure 1:
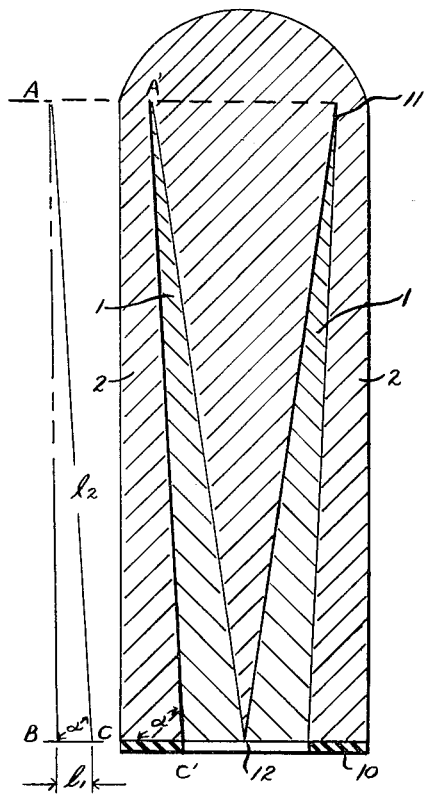

INVENTORS.
WILLARD S. BACON
JAMES V. BRAUN
BY
ATTORNEYS

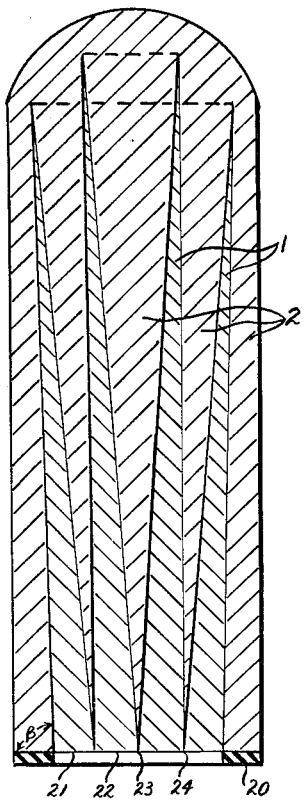
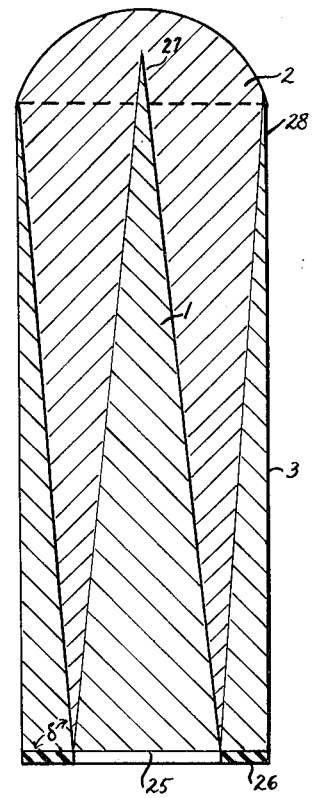
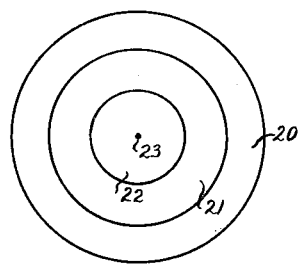
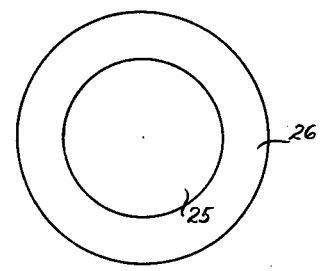

Nov. 16, 1965 J. V. BRAUN ETAL 3,217,651
MULTIPLE PROPELLENT GRAIN FOR ROCKET MOTORS
Original Filed Oct. 31, 1960 3 Sheets-Sheet 3

INVENTORS.
WILLARD S. BACON
JAMES V. BRAUN
BY
ATTORNEYS

United States Patent Office 3,217,651
Patented Nov. 16, 1965

3,217,651
MULTIPLE PROPELLENT GRAIN FOR
ROCKET MOTORS
James V. Braun, Lewisburg, Ohio, and Willard S. Bacon,
Columbia, Mo., assignors to the United States of America as represented by the Secretary of the Air Force
Original application Oct. 31, 1960, Ser. No. 66,360, now Patent No. 3,165,060, dated Jan. 12, 1965. Divided and this application Nov. 13, 1963, Ser. No. 323,510
36 Claims. (Cl. 102—98)
(Granted under Title 35, U.S. Code (1952), sec. 266)

The invention that is described herein may be manufactured and used by or for the Government for governmental purposes without, the payment to us of any royalty thereon.

This is a divisional application of our application Multiple Propellent Grain for Rocket Motors, Serial No. 66,360, filed October 31, 1960, and issued on January 12, 1965, as U.S. Patent No. 3,165,060.

This invention relates to solid propellants for rocket motors and more particularly to the structure of grains that each contains a plurality of propellants.

As a background for imparting a clear understanding of the present invention as claimed are cited the George P. Sutton book Rocket Propulsion Elements, published in 1956 by John Wiley and Sons, Inc., New York city, New York; Principles of Polymer Chemistry by Paul J. Flory, published in 1953 by the Cornell University Press, Ithaca, New York; The British Interplanetary Society Journal, volume 16, No. 17 dated October to December 1957 at pages 198 to 211, inclusive; Jet Propulsion of February 1956 at pages 102 to 105; U.S. Letters Patents No. 2,661,692 to Vegren; No. 2,820,410 to Tarr; No. 2,703,960 to Prentiss; No. 2,681,619 to Chandler; No. 2,524,591 to Chandler; and No. 1,074,809 to Newton.

Previously available perforated grain solid propellants do not permit the most efficient use of the available volume within the case because part of the case contains no propellant.

An object of this invention is to completely fill the case or shell with a plurality of solid propellants to provide a grain of materially superior performance as compared with any grain available previously. This invention provides a multiple propellent grain that comprises propellants of different burning rates and that permits the use of very high burning rate propellants, the previous use of which has been difficult or impossible.

Another object is to provide solid propellent grains that consist of multiple propellants of predetermined mathematically and geometrically precise symmetrical forms, shaped as cones, cylinders, cups, etc., that are dimensioned, positioned and proportioned such that they burn simultaneously and are simultaneously completely consumed and thereby continuously, steadily and smoothly deliver their optimum thrust from the time of their ignition to the time of their burnout. In this connection, attention is invited to FIGS. 5 and 7 on pages 205 and 207 of the British Journal article.

The present invention has as its nature and substance the provision of a generally cylindrically shaped rocket motor charge having a flat, circular base at one end and a semispherical portion at the end remote from the flat, circular base and that is composed of a plurality of propellants of prescribed and graduated burning rates, advantageous contours and dimensions such that the burning of all of the propellants in a grain ends at the same time. This result is accomplished by designing the propellants as long cone structures with sharp edges and points and with mathematically determined inclinations and proportionate dimensions that collectively provide a materially improved volumetric burning efficiency high mass ratio, low center of gravity travel and that eliminates previously encountered difficulties in burning high-burning rate propellants.

Figure 3:
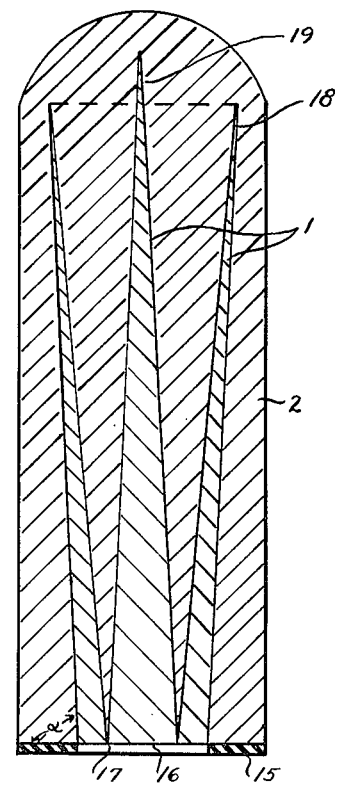
Figure 2:
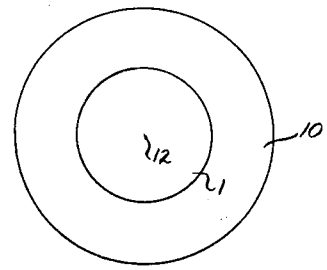
Figure 4:
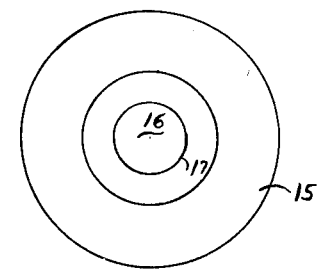
Figure 9:
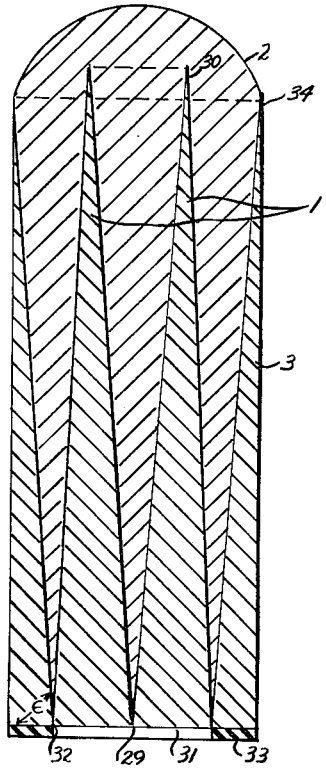
Figure 11:
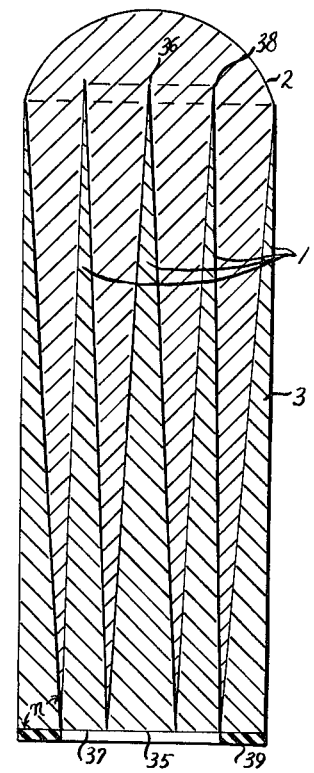
Figure 10:
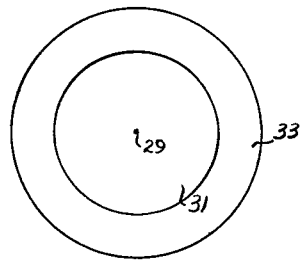
Figure 12:
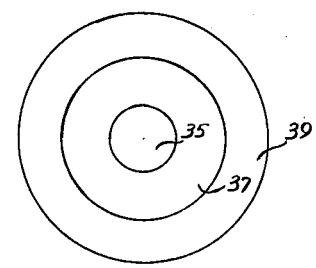

Illustrative embodiments of the present invention as embodied in molded grains and each grain consisting of multiple propellants are shown in the accompanying drawings, wherein:

FIG. 1 is an axial sectional view of a two-propellent grain;
FIG. 2 is a plan view from below of the grain that is shown in FIG. 1;
FIG. 3 is an axial sectional view of a two-propellent grain;
FIG. 4 is a plan view from below of the grain that is shown in FIG. 3;
FIG. 5 is an axial sectional view of a two-propellent grain;
FIG. 6 is a plan view from below of the grain that is shown in FIG. 5;
FIG. 7 is an axial sectional view of a three-propellent grain;
FIG. 8 is a plan view from below of the grain that is shown in FIG. 7;
FIG. 9 is an axial sectional view of a three-propellent grain;
FIG. 10 is a plan view from below of the grain that is shown in FIG. 9;
FIG. 11 is an axial sectional view of a three-propellent grain; and
FIG. 12 is a plan view from below of the grain that is shown in FIG. 11.

The propellent grains that are illustrated in the accompanying drawings are illustrative of operative grains that fit into a hollow rocket case, not shown, that is cylindrical and that is open at one end. The case commonly comprises a wall of 41–30 steel, of the composition with iron of C 0.28 to 0.33; Si 0.20 to 0.35; P 0.04 maximum; Cr 0.80 to 1.10; Mn 0.40 to 0.60; and others 0.15 to 0.25.

The illustrative operative grains are 14.5 cm. long and 5.0 cm. in diameter. The operative grains consist of a plurality of propellants that completely fill the rocket case and cover its inner surface prior to burnout. The plurality of propellants in each grain are end-burning and burn simultaneously. The different propellants in each grain are designed to start and to stop burning together. This characteristic affords a uniform and maximum propulsion force continuously delivered by each grain during its burning period. This result is accomplished by the spatial distribution of the propellants in each grain referred to the base or flat bottom end of the grain as plane of reference, coupled with the burning rate of the propellants in the grain.

In FIG. 1 of the accompanying drawings for example, the grain consists of the fast-burning propellant 1 interleaved with the more slowly burning propellant 2 or in FIGS. 7 to 12, inclusive, the more slowly burning propellant 3 depending on the geometry of the grain.

A solid propellant to satisfy the requirements of the grain is made from a liquid polymeric substance and an oxidizer which are intimately mixed and then solidified by chemically curing the polymer. A polymeric material which satisfies the requirements of propellant 1 is 11,12 dicarbadodecaborane with the empirical formula

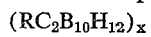

and of the structural formula

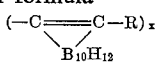

wherein R is a polymeric coupling moity selected from the group illustratively of vinyl (—C=C—) and carboxyl

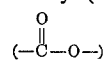

etc. and $x$ signifies the repetition of the polymeric structure.

The fast-burning propellant is comprised of the above polymeric material or a satisfactory substitute, and an oxidizer such as ammonium perchlorate of the formula $NH_4ClO_4$. The oxidizer, which is normally crystalline is finely ground and is mixed with the uncured liquid polymer at slightly elevated temperatures of from 120 to 150° F. and one atmosphere of pressure. This liquid mix contains 70 to 85 percent by weight of oxidizer and is of sufficiently low viscosity to permit pouring by gravity around a forming mandrel.

The propellent grain is formed directly into the case in which it is to be used and is then cured by maintaining the entire mass at elevated temperatures of from 120 to 150° F. for a period of 24 to 72 hours for further polymerization. Manufacturing details of this grain follow standard practices as outlined in chapter 10, of "Rocket Propulsion Elements" by George P. Sutton.

The slow-burning propellant illustratively is ammonium perchlorate in amounts from 70 to 85 percent by weight mixed with polybutadiene acrylic acid polymer as set forth hereinafter.

The two propellants are to be ignited simultaneously at the base of the grain inwardly of a restrictor 10 of asphalt, rubber, or the like. The propellants are to burn at different but uniform rates and are to cease burning at the same time. The geometric aspect of the propellants in FIG. 1 are characteristic of the grains in the other figures of the drawings.

In FIGS. 1 and 2 the fast-burning 11,12 dicarbadodecaborane propellant 1 projects upwardly from the grain base within the more slowly burning propellant 2. The propellant 1 is in the shape of an upwardly opening V-shaped cup that terminates at the top in a rim 11. The cup is a symmetrical body of uniform composition and is filled with the propellant 2. The rim 11 of the cup is closer radially to the rocket case than is the bottom of the cup and to accomplish this result a collapsing type of mandrel that is common in the trade is used. The propellant 2 fills the V-shaped upwardly opening cup with a symmetrical conical portion that terminates downwardly in a cone apex 12. The apex 12 of the propellant 2 cone terminates downwardly in the center of the grain base with sufficient propellant 2 exposed for being ignited at the base simultaneously with the lighting of the propellant 1 radially inwardly from the restrictor 10.

The circular flat restrictor 10 is made of asphalt, rubber, or the like, and covers the propellant 2 at the grain base, leaving for the simultaneous ignition of the grain the base of the propellant 1 and the apex 12 of the centrally disposed propellant 2 cone. The cone of the propellant 2 extends centrally of the grain with the propellant 1 positioned between the cone and the outer part of the propellant 2 at an accurately defined angle $\alpha$ with reference to the base, as indicated to the left of FIG. 1.

The angle $\alpha$ has a particular value that is determined for a particular propellant by its characteristics of burning rate $\gamma$, time of burning $t$ and the distance $l$ the propellant extends up into the grain.

In the diagram to the left of FIG. 1, with AB parallel to the generatrix of the grain cylinder and AC parallel to A'C' of the propellant 1, $$\cos \alpha = \frac{l_1}{l_2}$$

With the factor subscripts indicating the first and second propellants and the propellant-burning time $t_1$ equal to the propellant-burning time $t_2$ then the values are:

$$t_1 = t_2, \quad t_1 = \frac{l_1}{\gamma_1} \text{ and } t_2 = \frac{l_2}{\gamma_2}$$

or $$\frac{l_1}{\gamma_1} = \frac{l_2}{\gamma_2} \text{ or } \frac{l_1}{l_2} = \frac{\gamma_1}{\gamma_2}$$

By substituting for particular propellants the known values of their burning rates and their lengths, the angle $\alpha$ is determined such that the propellants are consumed at the same time and no unburned sliver of propellant remains in the rocket case.

In FIG. 1 of the accompanying drawings for the grain size shown, the angle $\alpha$ illustratively is about 88°, the center cone tip 12 or cone apex angle illustratively is about 17° and the angle at the upper edge 11 of the propellant 1 illustratively is about 6°.

The multiple propellants that are referred to herein are those that are currently used for their value of propulsion in rocketry and are roughly distinguished from each other herein by their relative burning rates as being fast propellant 1, intermediate propellant 2 and slow propellant 3. Illustrative burning rates are given on page 202 of the British Journal article and in the Sutton reference at pages 312 to 317 and 350.

For both di-propellent grains and for tri-propellent grains that are disclosed herein, the fast propellant 1 has the same illustrative value of burning rate range per second of from 1 inch to 100 inches. The tri-propellent intermediate propellant 2 has an illustrative burning rate per second of from 0.2 inch to 1 inch. The tri-propellent slow propellant 3 has an illustrative burning rate of from 0.05 inch to .2 inch. The size and shape of a rocket motor effects the burning rates of the propellants that are used in the rocket case of the rocket motor.

The propellants commonly used in rocketry may be divided roughly into the groups that are referred to above as fast 1, intermediate 2, and slow 3.

Specific high energy system fast-burning rate propellants 1 are represented illustratively herein by the compound 11,12 dicarbadodecaborane. Other propellants with fast-burning rates are high energy systems that are commercially available as polymeric compounds such as combustible polymers that have high contents of nitrogen, nitrogen and boron, nitrogen and fluorine and the like.

Propellants of the intermediate burning rate 2 illustratively are fully or highly nitrated cellulose and glycerine compounds, ammonium perchlorate mixed with other compounds such as selected polymers, powdered aluminum for its exothermic energy content and the like. Commercially available materials in this group are designated in the trade as high and low burning rate double base nitroglycerine and nitrocellulose which are plastisols, composites of crystalline materials with polymers, and the like. Particular composite binders are polyurethane, polybutadieneacrylic acid polymer that is merchandised under the title PBAA polysulfide, polyesters, polyacrylates, polyvinyl chloride, polyvinyl acetate, butyl rubbers, and the like.

Propellants of the slow-burning rate 3 may be illustrated by composites using as an oxidizer ammonium nitrate mixed with, as binder cellulose acetate or polyurethane, equal parts of polybutadiene and acrylic acid copolymer, polybutadiene methyl vinylpyridine copolymer, a polysulfide polymer of linked hydrocarbons, commercially available rubber such as butyletherpolysulfide polymer and the like.

FIGS. 3 and 4 illustrate a two-propellent grain that comprises a fast-burning propellant 1, such as 11,12 dicarbadodecaborane interleaved with an intermediate burning rate propellant 2, such as ammonium perchlorate and PBAA or the like. The angle $\alpha$ at the base is illustratively 88°, as in FIG. 1. A restrictor 15 of asphalt, rubber, or the like, covers the outer ring base portion of the propellant 2. In this structure the grain is ignited inwardly of the restrictor 15 at the base 16 of the propellant 1 and the lower ring edge or rim 17 of the propellant 2. The propellant 2 lower ring edge or rim 17 measures 8°. The propellant 1 upwardly opening cup concentric with the cone terminates upwardly in an edge 18 that measures 3°. The propellant 1 upper cone apex 19 measures 5°.

FIGS. 5 and 6 illustrate a two-propellent grain that comprises a fast-burning propellant 1, such as 11, 12 dicarbadodecadorane and an intermediate burning rate propellant 2, such as, ammonium perchlorate with PBAA. The fast-burning propellant 1 is shaped as a pair of coaxial upwardly opening cups that contain propellant 2 and with their coaxial ring bases 21 and 22 within the plane of the grain base and the cup walls tapering upwardly to thin inner and outer cup rims that are remote from the grain base. The inner cup wall rim is spacially farther away from the grain base than is the outer cup wall rim. Both cup walls have the slower propellant interposed therebetween as well as outside the outer cup wall. The base of the inner cup is separated from the base of the outer cup in the plane of the grain base by a thin section of the slow-burning rate propellant in an edge or rim 24. The angle β made by the outer side interface of the propellants 1 and 2 with the grain base is 89°. A restrictor 20 of asphalt, rubber, or the like, covers the outside ring base portion of the propellant 2.

In this structure the grain is ignited inwardly of the restrictor 20 at the more rapidly burning propellant 1 base rings 21 and 22 and the base tips of the more slowly burning propellant 2 central cone apex 23 and the edge or rim 24. The propellant 2 central cone lower apex 23 measures 8°. The propellant 2 ring downwardly tapering lower edge 24 measures 4°. The propellant 1 inner ring upper edge measures 3° and the outer ring upper edge measures 4°.

FIGS. 7 and 8 illustrate a three-propellent grain comprising a fast-burning propellant 1 as a central cone of 11,12 dicarbadodecaborane with its base 25 inwardly from a restrictor 26 of asphalt, rubber, or the like, and terminating upwardly in an apex 27 that measures 13°; an intermediate propellant 2 of ammonium perchlorate with PBAA opening downwardly as a cup around the cone of propellant 1 and the cup wall tapering downwardly to the grain base in a ring edge that measures 11°; and a slow propellant 3 of ammonium nitrate mixed with cellulose acetate or the like, outer cylinder with a wall that tapers upwardly to an edge 28 that measures 5° and that thickens downwardly to make an inner angle δ of 85° with the base.

FIGS. 9 and 10 illustrate a three-propellant grain that comprises a fast-burning propellant 1 with its base 31 in the plane of the grain base and that is in the form of an upwardly open cup with a side wall of diminishing thickness that terminates upwardly in an edge 30 that measures 8°; an intermediate propellant 2 that consists of a central cone portion that tapers downwardly to an apex 29 that measures 9° at centrally of the grain base and downwardly to an open cup portion starting from both sides of the propellant 1 edge 30 as a downwardly open cup with a downwardly tapering wall that terminates downwardly at the grain base in an edge 32 that measures 6°; and a slow propellant 3 that is covered at the base by the restrictor 33 and that is a cylindrical wall that becomes more thin upwardly to an edge 34 that measures 5°. The slow propellant interface with the intermediate propellant makes an angle ε with the base of 86°.

The central cone portion of the intermediate burning rate propellant 2 is generated around an axis that is coaxial with the axis of the overall cylindrically shaped body of the rocket propellant grain, as are all of the other conical shapes of the rocket propellants that are disclosed herein. As are shown in all of the drawings, the overall cylindrically shaped rocket propellant body has a circular, flat bottom end, cylindrical sides and an upper or top end that is half a sphere.

A restrictor that is made of asphalt or rubber and that is shaped like a flat washer overlies and is glued to the bottom end of the overall cylindrically shaped body of the rocket propellent grain. The restrictor overlies the slow propellant in the plane of the flat bottom end of the overall cylindrically shaped rocket propellent grain body.

FIGS. 11 and 12 illustrate a three-propellent grain that comprises a fast-burning propellant 1 with a central cone that rises from its base 35 to its apex 36, with an apex angle of 6° concentric with a ring that rises from its base 37 to an upper edge 38 that measures 5°; and intermediate-burning rate propellant 2 that tapers downwardly to the base in concentric inner and outer edges that each measures 5°; and a slow-burning rate propellant 3 that at the base is covered by the restrictor 39 and that tapers upwardly to an edge 40 that measures 4°. The slow propellant 3 inner angle eta with the base is 86° to the base.

It is to be understood that the contours, dimensions, angles and the propellent compositions that are disclosed herein may be modified somewhat to accommodate particularly desirable combinations and structures.

We claim:

1. A generally cylindrical end burning propellent grain having a flat circular base at one end and a semispherical portion at the other end, said propellent comprising two charges, one of said charges having a fast and the other of said charges having a slower-burning rate, a first conical slower-burning charge positioned along the longitudinal axis of the cylindrical propellent grain, the apex of the said conical portion being located in the plane of said circular base, the base of the conical portion being integral with the semispherical portion, an annular fast-burning charge surrounding and in contact with the conical slower-burning charge, said fast-burning charge having a base portion located in the plane of the said circular base, said annular fast-burning charge having walls narrowly tapering from said base and extending to said semispherical portion, a second-slower burning annular charge surrounding and in contact with said fast-burning charge, said second slower-burning charge having a base portion located in the plane of the said circular base and having a narrowly tapered wall extending to said semispherical portion.

2. The grain defined by claim 1 wherein the conical slower-burning charge tapers into an apex of about 17 degrees.

3. The grain defined by claim 1 wherein the interface of the second slower-burning annular charge with the fast-burning charge forms an angle of about 88 degrees with the grain base.

4. The grain defined by claim 1 wherein the fast-burning charge forms an axially open cup filled with the slower-burning propellant and has a terminal upper edge of about 6 degrees.

5. The grain defined by claim 1 wherein a restrictor covers the outside base portion of the slower-burning propellant.

6. The grain defined by claim 1 wherein the fast-burning charge is the polymeric material derived from 11,12 dicarbadodecaborane and 70 to 85 weight percent ammonium perchlorate as oxidizer, within the temperature range of 120 to 150 degrees F. at about one atmosphere of pressure for from 24 to 72 hours and the slower-burning propellant is from 70 to 85 weight percent ammonium perchlorate polybutadiene acrylic acid polymer.

7. The grain defined by claim 1 wherein the fast-burning charge has a burning rate in the range of from 1 to 100 inches per second.

8. A generally cylindrical end burning propellent grain having a flat circular base at one end and a semispherical portion at the other end, said propellant comprising two charges, one of said charges having a fast and the other of said charges having a slower-burning rate, a first conical fast-burning charge positioned along the longitudinal axis of the cylindrical propellent grain, the base of the conical portion being located in the plane of said circular base, the apex of the conical portion extending to the semispherical portion, an annular slower-burning charge surrounding and in contact with the conical fast-burning charge, said slower-buring charge having a base portion integral with the semispherical portion said annular slower-burning charge having walls narrowly tapering to said circular base, a second fast-burning charge surrounding and in contact with the said annular slower-burning propellant charge, the said fast-burning charges having a base portion located in the plane of the said circular base, said annular fast-burning charge having walls narrowly tapering from said base and extending to said semispherical portion, a second slower-burning annular charge surrounding and in contact with said second fast-burning charge, said second slower-burning charge having a base portion located in the plane of the said circular base and having a narrowly tapered wall extending to said semispherical portion.

9. The grain defined by claim 8 wherein the fast-burning conical portion tapers into an apex of about 5 degrees.

10. The grain defined by claim 8 wherein the interface of the second slower-burning charge with the second fast-burning charge makes an angle of about 88 degrees with the grain base.

11. The grain defined by claim 8 wherein the second fast-burning charge forms an upwardly opening cup and has an edge terminating upwardly in an angle of about 3 degrees.

12. The grain defined by claim 8 wherein a restrictor covers the outside base portion of the second slower-burning charge.

13. The grain defined by claim 8 wherein the fast-burning charge is a polymeric derivative of 11,12 dicarbadodecaborane and from 70 to 85 weight percent ammonium perchlorate cured at one atmosphere pressure for from 24 to 72 hours within the temperature range of from 120 to 150 degrees F., and the slower-burning charge is from 70 to 85 weight percent ammonium perchlorate polybutadiene acrylic acid polymer.

14. The grain defined by claim 8 wherein the fast-burning charge has a burning rate in the range of from 1 to 100 inches per second.

15. A generally cylindrical end burning propellant grain having a flat circular base at one end and a semispherical portion at the other end, said propellant comprising two charges, one of said charges having a fast and the other of said charges having a slower burning rate, a first conical slower burning charge positioned along the longitudinal axis of the cylindrical propellant grain, the apex of the conical portion being located in the plane of said circular base, the base of the conical portion being integral with the semispherical portion, a first annular fast-burning charge surrounding and in contact with the said conical slower burning charge, said fast-burning charge having a base portion located in the plane of the said circular base, said annular fast burning charge having walls narrowly tapering from said base and extending to said semispherical portion, a second slower annular propellant charge extending from said semispherical portion surrounding and in contact with said fast-burning charge, said second slower charge having walls narrowly tapering from said semispherical portion and extending to said circular base, a second fast-burning annular charge surrounding and in contact with said second slower-burning annular charge, said second fast-burning charge having a base portion located in the plane of the said circular base and having narrowly tapered walls extending to said semispherical portion, a third slower-burning annular charge, said third slower-burning charge having a base portion located in the plane of the said circular base and having a narrowly tapered wall extending to said semispherical portion.

16. The grain defined by claim 15 wherein the first annular fast-burning charge and the second fast-burning annular charge form a pair of coaxial and upwardly opening cups having upper rims which taper to angles of about 3 to 4 degrees.

17. The grain defined by claim 15 wherein the first conical slower-burning charge tapers downward to an apex of about 8 degrees.

18. The grain defined by claim 15 wherein the second slower annular propellant charge tapers downwardly to an edge of about 4 degrees.

19. The grain defined by claim 15 wherein the interface of the third slower-burning charge with the second fast-burning annular charge forms an angle of about 89 degrees with the grain base.

20. The grain defined by claim 15 wherein a restrictor covers the outside base portion of the third slower-burning charge.

21. The grain defined by claim 15 wherein the fast-burning propellent charge is a combustible derivative of 11, 12 dicarbadodecaborane mixed with 70 to 85 weight percent ammonium perchlorate and the slower-burning charge is from 70 to 85 percent ammonium perchlorate in polybutadiene acrylic acid polymer.

22. The grain defined by claim 15 wherein the fast-burning charge has a fast-burning charge in the range of from 1 to 100 inches per second.

23. A generally cylindrical end burning propellant grain having a flat circular base at one end and a semispherical portion at the other end, said propellant comprising three charges, each of said charges having a different burning rate, a first conical fast-burning charge positioned along the longitudinal axis of the cylindrical propellant grain, the base of the conical portion being located in the plane of said circular base, the apex of the conical portion extending to the semispherical portion, an annular intermediate burning charge surrounding and in contact with the conical fast-burning charge, said intermediate charge having an annular wall narrowly tapering from said semispherical portion and extending to said circular base, a slow burning annular charge surrounding and in contact with said intermediate burning charge, said slow burning charge having a base portion located in the plane of the said circular base and having a narrowly tapered wall extending to said semispherical portion.

24. The grain defined by claim 23 wherein the fast-burning propellant tapers into an apex of about 13 degrees.

25. The grain defined by claim 23 wherein the annular wall of the intermediate burning charge tapers downwardly to a ring edge of about 11 degrees.

26. The grain defined by claim 23 wherein the narrowly tapered wall of the slower-burning annular charge tapers upwardly to form an edge of about 5 degrees with the outer cylinder wall.

27. The grain defined by claim 23 wherein the interface between the slower-burning annular charge and the intermediate annular charge forms an angle of about 85 degrees with the grain base.

28. The grain defined by claim 23 wherein the fast-burning charge is the polymeric material derived from 11,12 dicarbadodecaborane mixed with from 70 to 85 weight percent ammonium perchlorate as oxidizer cured at one atmosphere pressure for from 24 to 72 hours within the temperature range of from 120 to 150 degrees F., the intermediate propellant is highly nitrated cellulose, and the slower propellant is from 70 to 85 weight percent ammonium nitrate in polybutadiene acrylic acid polymer.

29. The grain defined by claim 23 wherein the fast-burning charge has a burning rate in the range of 1 to 100 inches per second, the intermediate burning charge has a burning rate in the range from 0.2 to 1 inch per second, and the slower-burning charge has a burning rate of from 0.05 to 0.2 inch per second.

30. A generally cylindrical end burning propellant grain having a flat circular base at one end and a semispherical portion at the other end, said propellant comprising three charges, each of said charges having a different burning rate, a first conical fast burning charge positioned along the longitudinal axis of the cylindrical propellant grain, the base of the conical portion being located in the plane of said circular base, the apex of the conical portion extending to the semispherical portion, an annular intermediate burning charge surrounding and in contact with the conical fast burning charge, said intermediate burning charge having walls narrowly tapering from said semispherical portion and extending to said circular base, a second fast-burning annular propellant charge having a base portion located in the plane of the said circular base, said annular fast burning charge having walls narrowly tapering from said base and extending to said semispherical portion and in contact with said intermediate burning charge, a second intermediate burning annular charge surrounding said second fast burning charge, said second intermediate burning charge having walls narrowly tapering from said semispherical portion and extending to said circular base, a slow burning annular charge surrounding and in contact with said second intermediate burning charge, said slow burning charge having a base portion located in the plane of the said circular base and having a narrowly tapered wall extending to said semispherical portion.

31. The grain defined by claim 30 wherein the first conical fast-burning charge tapers into an apex of about 6 degrees.

32. The grain defined by claim 30 wherein the annular fast, intermediate, and slow-burning charges taper to an edge having an angle in the range of about 4 to 5 degrees.

33. The grain defined by claim 30 wherein the interface between the slower-burning annular charge and the second intermediate-burning annular charge makes an angle of about 86 degrees with the base of grain.

34. The grain defined by claim 30 wherein a restrictor covers the outside base portion of the slower-burning propellant.

35. The grain defined by claim 30 wherein a fast-burning charge is the polymeric material derived from 11,12 dicarbadodecaborane mixed with from 70 to 85 weight percent ammonium perchlorate as oxidizer cured at one atmosphere pressure for from 24 to 72 hours within the temperature range of from 120 to 150 degrees F., the intermediate propellant is highly nitrated cellulose, and the slower propellant is from 70 to 85 weight percent ammonium nitrate in polybutadiene acrylic acid polymer.

36. The grain defined by claim 30 wherein the fast-burning charge has a burning rate in the range of 1 to 100 inches per second, the intermediate burning charge has a burning rate in the range from 0.2 to 1 inch per second, and the slower-burning charge has a burning rate of from 0.05 to 0.2 inch per second.

References Cited by the Examiner
UNITED STATES PATENTS

| | | | |
|---|---|---|---|
| 1,920,075 | 7/1933 | Haenichen | 102—98 |
| 3,006,743 | 10/1961 | Fox et al. | 149—22 |
| 3,028,432 | 4/1962 | Ross | 149—22 |
| 3,048,112 | 8/1962 | Shope | 102—98 |
| 3,052,092 | 9/1962 | Kirkbride | 102—98 X |
| 3,073,242 | 1/1963 | Hewson | 102—98 |
| 3,149,168 | 9/1964 | Karlan et al. | 149—22 |

OTHER REFERENCES

"Solid Fuel Ind. Round-Up" (referred to herein as Solid Fuel), Missiles and Rocket Magazine, vol. 2, No. 8, August 1957, pp. 67–73 required.

Warren: Rocket Propellants, pp. 11, 23, 28–39 required (Reinhold Pub. Co., New York, N.Y., 1958).

BENJAMIN A. BORCHELT, *Primary Examiner.*

SAMUEL FEINBERG, *Examiner.*